US008481145B2

(12) United States Patent
Ohtomo

(10) Patent No.: US 8,481,145 B2
(45) Date of Patent: Jul. 9, 2013

(54) SINTERED CUBIC BORON NITRIDE TOOL

(75) Inventor: Katsuhisa Ohtomo, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 183 days.

(21) Appl. No.: 12/933,136

(22) PCT Filed: Mar. 19, 2009

(86) PCT No.: PCT/JP2009/055393
§ 371 (c)(1),
(2), (4) Date: Sep. 17, 2010

(87) PCT Pub. No.: WO2009/116610
PCT Pub. Date: Sep. 24, 2009

(65) Prior Publication Data
US 2011/0014426 A1    Jan. 20, 2011

(30) Foreign Application Priority Data
Mar. 19, 2008   (JP) .................................. 2008-070615

(51) Int. Cl.
*C09C 1/68* (2006.01)

(52) U.S. Cl.
USPC ........... 428/143; 428/192; 428/697; 428/564; 428/402; 51/307; 51/309; 407/113; 407/114; 407/115; 407/116; 407/118; 407/119

(58) Field of Classification Search
None
See application file for complete search history.

(56) References Cited

U.S. PATENT DOCUMENTS

| 4,224,380 | A | 9/1980 | Bovenkerk et al. |
| 6,612,786 | B1 | 9/2003 | Kanada et al. |
| 2007/0172675 | A1* | 7/2007 | Omori et al. ................. 428/469 |
| 2008/0193724 | A1* | 8/2008 | Okamura et al. ............ 428/192 |

FOREIGN PATENT DOCUMENTS

| EP | 1188504 A1 | 3/2002 |
| EP | 1886749 A1 | 2/2008 |
| JP | 1 598 837 | 9/1981 |
| JP | 07-018415 | 1/1995 |
| JP | 2002-275571 | 9/2002 |

OTHER PUBLICATIONS

International Search Report in PCT/JP2009/055393, dated Apr. 21, 2009.
Extended European Search Report dated Aug. 19, 2011 issued in EP counterpart application (EP 09722979.3).

* cited by examiner

*Primary Examiner* — Jennifer McNeil
*Assistant Examiner* — Daniel J Schleis
(74) *Attorney, Agent, or Firm* — Womble Carlyle

(57) ABSTRACT

A sintered cubic boron nitride tool can perform stable machining without causing any defect for a long lifetime even under a high-load cutting condition and a high-efficiency cutting condition. The sintered cubic boron nitride tool is such that: assuming a reference length longer than five times an average particle size of cubic boron nitride is S, when a total length of profile curves of cubic boron nitride included in the reference length S of the chamfer honing surface is LCC, when a total length of profile curves of the binder phase included in the reference length S of the chamfer honing surface is LCB, and a ratio of LCC to LCB is PC(PC=LCC/LCB), and when a total length of profile curves of cubic boron nitride included in the reference length S of the round honing surface is LRC, a total length of profile curves of the binder phase included in the reference length S of the round honing surface is LRB, and a ratio of LRC to LRB is PR(PR=LRC/LRB), then, a ratio of PR to PC (PR/PC) satisfies the relation of $1.2 \leq PR/PC \leq 8.0$.

23 Claims, 8 Drawing Sheets

A−A' Sectional surface

SINTERED CUBIC BORON NITRIDE TOOL

RELATED APPLICATIONS

This is a 371 U.S. National Phase Application of PCT/JP2009/055393, filed 19 Mar. 2009, which claims priority to JP 2008-070615, filed 19 Mar. 2008. The contents of the aforementioned applications are incorporated by reference in their entirety.

FIELD OF THE INVENTION

The present invention relates to a sintered cubic boron nitride tool used for cutting machining.

BACKGROUND

For cutting machining of a hardened steel or a heat resistant alloy, a sintered cubic boron nitride tool has been frequently used. For example, when a machine part such as a shaft of an automobile, etc., is to be produced by subjecting a hardened steel to cutting machining, a carburized layer existing at the surface of the hardened steel is removed by cutting machining, but depending on a shape of the material to be cut, a part which has not subjected to quenching is sometimes subjected to cutting machining. In such a high-load cutting machining, a temperature of the blade edge became extremely high, so that a sintered cubic boron nitride tool has been used in many cases. As a prior art technique of the sintered cubic boron nitride tool, there is a polycrystalline hard sintered body cutting tool in which a radius of curvature at a blade edge line portion is 5 μm or more and 30 μm or less, and a tool relief surface, and a tool rake surface or a negative land surface are smoothly connected to the above-mentioned radius of curvature.

See Patent Document JP 2001-212703A.

SUMMARY OF THE INVENTION

In recent years, it has been required to prepare a cutting tool which can endure high-efficiency cutting machining or high-load cutting machining in order to increase machining efficiency of parts machining. However, in the conventional sintered cubic boron nitride tool, when high-efficiency cutting machining or high-load cutting machining is carried out, chipping due to lack of strength of a blade edge or chipping caused by enlargement of crater wear is likely caused, so that the demand for improving machining efficiency has not sufficiently be satisfied. Thus, an object of the present invention is to provide a sintered cubic boron nitride tool which is capable of subjecting to stable machining without causing any defect under high-load cutting conditions or high-efficiency cutting conditions, which can establish elongation of tool lifetime.

The present inventor has studied to develop a sintered cubic boron nitride tool and coated sintered cubic boron nitride tool which can establish elongation of tool lifetime under severe cutting machining such as high-load cutting machining and high-efficiency cutting machining, and obtained a finding that there is an optimum combination between respective parts of the sintered cubic boron nitride tool and a surface structure. Between a round honing surface and chamfer honing surface, load or heat applied thereto at the time of cutting are different from each other. In the round honing surface, thermal load is large and blade edge strength is required, so that it is preferred to increase an amount of the cubic boron nitride which shows high hardness and high thermal conductivity. On the other hand, in the chamfer honing surface which causes rubbing of chip, dropping of the cubic boron nitride due to welding of chip is likely caused, so that it is preferred to increase an amount of the binder phase. Thus, by providing optimum surface structures to the round honing surface and the chamfer honing surface, respectively, it can be realized to accomplish elongation of lifetime of a tool in severe cutting machining such as high-load cutting machining and high-efficiency cutting machining.

That is, the present invention relates to a sintered cubic boron nitride tool, wherein at least a part which participates in cutting comprises a sintered cubic boron nitride tool comprising cubic boron nitride, a binder phase and inevitable impurities, having a relief surface, a rake surface, a chamfer honing surface and a round honing surface formed by an edge line crossed by the relief surface and the chamfer honing surface, a shape of the round honing surface being a radius of curvature R in the range of 10 to 50 μm, when assuming a reference length longer than five times an average particle size of cubic boron nitride is S, when a total length of profile curves of cubic boron nitride included in the reference length S of the chamfer honing surface is LCC, when a total length of profile curves of binder phase included in the reference length S of the chamfer honing surface is LCB, a ratio of LCC to LCB is PC(PC=LCC/LCB), a total length of profile curves of cubic boron nitride included in the reference length S of the round honing surface is LRC, a total length of profile curves of the binder phase included in the reference length S of the round honing surface is LRB, and a ratio of LRC to LRB is PR(PR=LRC/LRB), then a ratio of PR to PC(PR/PC) satisfies the relation of $1.2 \leqq PR/PC \leqq 8.0$.

The sintered cubic boron nitride tool of the present invention comprises at least a part which participates in cutting being a cubic boron nitride sintered body. The sintered cubic boron nitride tool of the present invention may be a sintered cubic boron nitride tool in which the cubic boron nitride sintered body is brazed to a hard alloy base metal, or a sintered cubic boron nitride tool whole part of which comprises the cubic boron nitride sintered body.

The cubic boron nitride sintered body of the present invention comprises cubic boron nitride, a binder phase and inevitable impurities as essential constitutional components. In the present invention, the cubic boron nitride is preferably 40 to 90% by volume, more preferably 50 to 80% by volume, and the reminder is a binder phase and inevitable impurities. If the content of the cubic boron nitride is less than 40% by volume, hardness of the substrate is not sufficient against a hard material such as a hardened steel and chipping resistance is lowered, while if it exceeds 90% by volume, a ratio of the binder phase is relatively small, so that dropping of the cubic boron nitride occurs due to chip rubbing and welding whereby wear is markedly progressed.

The cubic boron nitride of the present invention has an average particle size of preferably 0.30 to 6.0 μm, more preferably 1.5 to 5.0 μm. If the average particle size of is less than 0.30 μm, thermal conductivity is lowered, so that blade edge temperature is increased at the time of cutting and strength of the edge is lowered whereby defect is likely caused, while if the average particle size of is larger than 6.0 μm, dropping of the particles is likely caused so that chipping is likely generated.

In the cubic boron nitride sintered body of the present invention, the binder phase preferably comprises at least one kind selected from the group consisting of a metal, nitride, carbide, boride, oxide of Group 4, 5, and 6 elements of the Periodic Table, Al, Si, Mg, Co and Ni, and mutual solid solutions thereof to improve toughness of the binder phase.

Specific examples of the binder phase may be mentioned a metal Ti, metal Co, metal Ni, metal Al, TiN, Ti (B,N), Ti (B,C), Ti (B,O), Ti (B,N,O), Ti (B,N,C), Ti (B,N,O), Ti (B,N,C,O), (Ti,L)(B,N), (Ti,L)(B,C), (Ti,L)(B,O), (Ti,L)(B,N,C), (Ti,L)(B,N,O), (Ti,L)(B,C,O), (Ti,L)(B,N,C,O), AlN, Al(B, N), Al(B,C), Al(B,O), Al(B,N,O), Al(B,N,C), Al(B,C,O), Al(B,N,C,O), (Al,L)(B,N), (Al,L)(B,C), (Al,L)(B,O), (Al,L)(B,N,O), (Al,L)(B,N,C), (Al,L)(B,C,O), (Al,L)(B,N,C,O) (provided that the above-mentioned L represents at least one kind of Zr, Hf, V, Nb, Ta, Cr, Mo, W, Si, Mg, Co and Ni.), etc. Of these, the binder phase is more preferably at least one kind selected from a metal of Ti or Al, a nitride, carbide, boride, oxide and mutual solid solution thereof. As the impurities inevitably contained in the cubic boron nitride sintered body of the present invention, there may be mentioned Fe, Cu, etc. migrated from the starting powder of the cubic boron nitride sintered body. A total amount of the inevitable impurities is generally 0.5% by weight or less based on the whole cubic boron nitride sintered body, and they can be generally controlled to 0.2% by weight or less, so that they do not affect to the characteristic values of the present invention. In the present invention, in addition to the cubic boron nitride, the binder phase and inevitable impurities, other component(s) which cannot be said to be inevitable impurities may be contained in a small amount within the range which does not impair the characteristics of the cubic boron nitride sintered body of the present invention.

The sintered cubic boron nitride tool of the present invention possesses, as shown in FIG. 2, a rake surface (3), a chamfer honing surface (5), a round honing surface (6) and a relief surface (4) at least a portion which participates in cutting. By having the chamfer honing surface (5) between the relief surface and the rake surface, chipping resistance is improved. Moreover, by forming the round honing surface (6) at the edge line portion of the relief surface and the chamfer honing surface, it can be realized to improve chipping resistance and capable of subjecting to stable cutting machining. At this time, when a radius of curvature R of a shape of the round honing surface is 10 μm or more, an effect of improving chipping resistance is remarkable. On the other hand, when a radius of curvature R of a shape of the round honing surface is large exceeding 50 μm, cutting resistance is markedly increased and chipping is rather likely caused at the blade edge. For these reasons, in the present invention, the radius of curvature R of the shape of the round honing surface is made 10 to 50 μm.

In the sintered cubic boron nitride tool of the present invention, when assuming a reference length longer than five times the average particle size of cubic boron nitride is S, the total length of profile curves of cubic boron nitride included in the reference length S of the round honing surface is LRC, the total length of profile curves of the binder phase included in the reference length S of the round honing surface is LRB, when the total length of profile curves of cubic boron nitride included in the reference length S of the chamfer honing surface is LCC, when the total length of profile curves of the binder phase included in the reference length S of the chamfer honing surface is LCB, the ratio of LRC to LRB is PR (PR=LRC/LRB), and the ratio of LCC to LCB is PC(PC=LCC/LCB), then, the ratio of PR to PC(PR/PC) satisfies the relation of $1.2 \leq PR/PC \leq 8.0$. It is more preferably $1.6 \leq PR/PC \leq 6.0$, particularly preferably $2.1 \leq PR/PC \leq 5.0$.

In the present invention, to make the composition suitable for characteristics required for respective parts at the time of cutting machining, ratios of the cubic boron nitrides in the round honing surface and the chamfer honing surface are changed. If the PR/PC is less than 1.2, an amount of the cubic boron nitride at the round honing surface is not sufficiently much more than the amount of the cubic boron nitride at the chamfer honing surface, a cutting temperature is high, chipping and crater wear of blade edge are likely caused so that the tool becomes short lifetime. If the PR/PC is large exceeding 8.0, a binder phase at the round honing surface becomes excessively little, so that dropping of the cubic boron nitride particles at the round honing surface occurs and chipping is likely caused.

LRC, LRB, LCC and LCB are measured by the following mentioned method as an example. A sintered cubic boron nitride tool is cut at A-A' line shown in FIG. 1 by an electro discharge machining, the obtained sectional surface is polished by #150 diamond whetstone, then, polished with #1500 diamond whetstone, and finally subjected to mirror surface treatment with a diamond paste having a grain size of 1 μm. Cutting at the A-A' line may be carried out by an ion milling using Ar ion.

The sectional surface subjected to mirror surface finishing or the surface obtained by an ion milling shown in FIG. 2 is observed by a scanning type electron microscope (SEM), and an average particle size of the cubic boron nitride is measured. A reference length S is so set as to it becomes 5-fold or more the average particle size of the cubic boron nitride. If the reference length S is less than 5-fold of the average particle size, measurement errors of the LRC, LRB, LCC and LCB become large. Also, by elongating the reference length S, the measurement error becomes small, and by making the reference length S 5 to 20-folds of the average particle size of the cubic boron nitride, the measurement error can be sufficiently made small. Incidentally, reference length S of a round honing surface is measured on an arc drawn by a radius of curvature R of the round honing.

The mirror surface-finished sectional surface is observed by a scanning electron microscope, and sectional surface structures of a round honing surface and a chamfer honing surface are photographed as shown in FIG. 3. With regard to the chamfer honing surface, an image of a cross-sectional micrograph is analyzed as shown in FIG. 4, lengths LCC1, LCC2, . . . , LCCn of profile curve of the cubic boron nitride at the chamfer honing surface, and lengths LCB1, LCB2, . . . , LCBn of profile curve of the cubic boron nitride at the chamfer honing surface are measured, respectively, and summed up these to obtain LCC and LCB.

$$LCC = LCC1 + LCC2 + \ldots + LCCn \quad \text{[Formula 1]}$$

$$LCB = LCB1 + LCB2 + \ldots + LCBn \quad \text{[Formula 2]}$$

With regard to the round honing surface, an image of a cross-sectional micrograph is analyzed as shown in FIG. 5, lengths LRC1, LRC2, . . . , LRCn of profile curve of the cubic boron nitride at the round honing surface, and lengths LRB1, LRB2, . . . , LRBn of profile curve of the binder phase at the round honing surface are measured, respectively, and summed up these to obtain LRC and LRB.

$$LRC = LRC1 + LRC2 + \ldots + LRCn \quad \text{[Formula 3]}$$

$$LRB = LRB1 + LRB2 + \ldots + LRBn \quad \text{[Formula 4]}$$

Due to the reasons that an average particle size of the cubic boron nitride is large, a radius of curvature R of the round honing surface is small, or a chamfer honing width T is short, and the like, there is a case where reference length S cannot ensure 5-fold or more of an average particle size of the cubic boron nitride only by one portion of the sectional surface curve. In such a case, the reference length S may be ensured by increasing a number of a measurement position of the sectional surface curve and reference lengths Sn of the respective sectional surface curves are added to obtain the sum thereof. Also, the reference length S may be ensured by observing a sectional surface curve which is in parallel direction to the edge line of the chamfer honing surface and the rake surface such as B-B' line and C-C' line in FIG. 7 which is an enlarged view of the perspective view (FIG. 6) of the sintered cubic boron nitride tool according to the present invention.

In the present invention, by covering a coating film on the surface of the sintered cubic boron nitride tool, wear resistance, oxidation resistance, lubricating function, etc. of the tool are improved, whereby tool lifetime can be further improved. A film formed by at least one kind selected from a nitride, carbide and/or oxide of Group 4, 5, and 6 elements of the Periodic Table, Al, Si, B, Y and Mn, and a mutual solid solution thereof is preferred since they have large effects of improving wear resistance, oxidation resistance, etc., and enhance tool lifetime. Of these, it is more preferred that a crystal system of a coating film to be provided directly on the cubic boron nitride sintered body is the same as a crystal system of the cubic boron nitride of the substrate, i.e., that the crystal system of the coating film is cubic, adhesiveness between the substrate and the coating film is improved so that peeling of the coating film is difficultly caused and excellent characteristics of the coating film can be sufficiently shown.

As the coating film of the present invention, there may be specifically mentioned a coating film comprising TiN, Ti(C, N), Ti(C,N,O), (Ti,B)N, (Ti,Al)N, (Ti,Al)(C,N), (Ti,Al)(C,N, O), (Ti,Si)N, (Al,Cr)N, (Al,Cr,B)N, (Ti,Nb)N, (Ti,Al,Cr)N, (Nb,Si)N, (Al,Cr,W)N, (Ti,Al,Si)N, (Hf,Al)N, (Zr,Al)N, (Ti, Nb,Al,Si)N, (Ti, Cr,Al,Si)N, (Ti,W,B)N, CrN, etc. Of these, when the coating film is formed by at least one kind selected from a nitride, carbide, oxide and mutual solid solutions thereof containing Ti and Al, a balance in oxidation resistance and wear resistance becomes good. Of these, when the coating film composition is $(Ti_{(1-a-b)}Al_aM_b)$ (X) (wherein M represents one or more elements selected from Y, Cr, Si, Zr, Nb, Mn, W, Hf, V and B, X represents one or more elements selected from C, N and O, a represents an atomic ratio of Al based on the total of Ti, Al and M, b represents an atomic ratio of M based on the total of Ti, Al and M, and a and b each represents $0.1 \leq a \leq 0.7$, $0.002 \leq b \leq 0.1$), it is particularly preferred since oxidation resistance is high and hardness of the coating film becomes high. Here, when a is 0.1 or more, oxidation resistance is improved, and cutting temperature is lowered whereby chipping resistance is improved, but if a is large exceeding 0.7, an MN phase which has low hardness is formed whereby wear resistance is lowered. Also, if b is 0.002 or more, oxidation resistance is improved and hardness of the coating film becomes high so that wear resistance is improved, but if b becomes large exceeding 0.1, compression stress due to lattice deformation becomes large whereby peeling of the coating film is likely caused.

A coating film to be formed on the surface of the sintered cubic boron nitride tool of the present invention has an effect of improving tool lifetime even when it is a film of a single layer, but it is more preferred to provide a multi-layered film in which two or more kinds of films having different compositions are coated since improved effects in lifetime are more remarkable. For example, as an inner layer, TiN or TiCN which is to improve adhesiveness is coated directly on the substrate, and as an outer layer, CrN, CrSiN, TiBN, metal-containing DLC, AlCrBN, AlCrN or TiSiN which is to improve lubricating function, welding resistance and oxidation resistance is coated thereon. It is also possible to coat a film of an alternately laminated film in which two or more kinds of thin films having different compositions are coated with a layer-laminating interval of 1 to 30 nm. The coating film of the alternately laminated film has high hardness and is improved in wear resistance, so that it has the effects that peeling or dropping of the coating film can be prevented by suppressing propagation of crack caused in the coating film at the time of cutting machining.

The coating film of the present invention has an average film thickness of preferably 1 to 6 µm, more preferably 2 to 5 µm. If the average film thickness is 1 µm or more, improved effects in wear resistance are remarkable, while if it is thick exceeding 6 µm, a tendency of lowering adhesiveness is observed due to the effect of the residual stress of the coating film.

The sintered cubic boron nitride tool of the present invention can be prepared, for example, by the following method. The sintered cubic boron nitride tool is subjected to grinding by a diamond whetstone to form respective portions of a relief surface, chamfer honing surface and rake surface of a blade edge. Thereafter, a round honing surface having a predetermined radius of curvature R is provided between the relief surface and the chamfer honing surface. As an example of the machining method of the round honing surface, there may be mentioned a mechanical treatment such as machining with a whetstone, blast, or rotary brush, an electrical treatment such as discharge machining, and further a treatment in which the above treatments are combined.

Next, in order to optimize surface compositions of the cubic boron nitride at the round honing surface and the chamfer honing surface, a vacuum device equipped with an ion etching electrode and a film-forming device is used. As the ion etching electrode, there may be mentioned a triode direct current sputtering method using a heat filament, etc. As the coating film-forming device, there may be mentioned an arc ion plating device, magnetron sputtering device, etc.

In the ion etching using a noble gas element, removal of the surface substance(s) can be carried out by attracting and colliding to the substrate the noble gas element ionized by applying a negative voltage (bias voltage) to the substrate. The cubic boron nitride which is harder than the binder phase is difficultly removed, so that the surface of the cubic boron nitride sintered body has a higher ratio of the cubic boron nitride than the inside thereof. In FIG. 8 and FIG. 9, surface structure SEM photographs of the cubic boron nitride sintered body after Ar ion etching treatment and before the treatment are shown, respectively. The granular black portions are cubic boron nitride, and the grayish white portion around the cubic boron nitride is a binder phase. The binder phase is predominantly removed by carrying out the ion etching treatment using a noble gas, so that it can be confirmed that a ratio of the cubic boron nitride is increased at the surface of the cubic boron nitride sintered body. Also, at the time of ion etching, charge density becomes high at a round honing surface which is a blade edge, and sputtering efficiency becomes higher than the other portions, but under the usual conditions, difference in sputtering efficiencies between the round honing surface and chamfer honing surface by the ion etching is not sufficient so that a present product cannot be obtained. Thus, as a means to obtain the present product, a coating film is firstly covered on the round honing surface and the chamfer honing surface smoothly (Film-forming condition 1). Here, by reducing the bias voltage to a low voltage of 15 to 18V, a round honing surface of the blade edge is to be coated as thinner as possible. As the coating film, there may be mentioned a metal film, nitride film, carbide film, etc., and it is not particularly limited, but in consideration of removing the coating film by ion etching using a noble gas thereafter, a metal film which is easily removable by ion etching is preferred.

Next, the smoothly coated film is to be removed. Here, when sputtering with a noble gas element is carried out in a short period of time under high bias voltage conditions (Ion etching condition 1) at 1200 to 2000V, the portion around the blade edge of the cubic boron nitride sintered body is predominantly removed. Thereafter, by treating a round honing surface and a chamfer honing surface under the conditions (Ion etching condition 2) of a bias voltage at 50V to 180V, the cubic boron nitride sintered body at the round honing surface is firstly exposed by the previous high bias treatment, whereby the cubic boron nitride sintered body at the round honing surface can be selectively etched. When the treatment is further continued, the coating film at the chamfer honing surface is also removed, whereby the whole part which participates in cutting is treated. Present products can be obtained by carrying out the steps of the above-mentioned Film-forming condition 1→Ion etching condition 1→Ion etching condition 2 repeatedly, if necessary. It is important to adjust various parameters of film formation and ion etching, a treatment time, etc., depending on various factors such as each vacuum treatment device, tool shape, a shape of the holding tool, a substrate composition of the tool, rotary mechanism of the device, a filling ratio of the tool to a vacuum device, etc.

The sintered cubic boron nitride tool of the present invention can be subjected to stable machining since chipping is difficultly caused under high-load cutting conditions or high-efficiency cutting conditions, so that it accomplishes the effect that elongation of tool lifetime can be established.

DETAILED DESCRIPTION

Example 1

Figure 1:
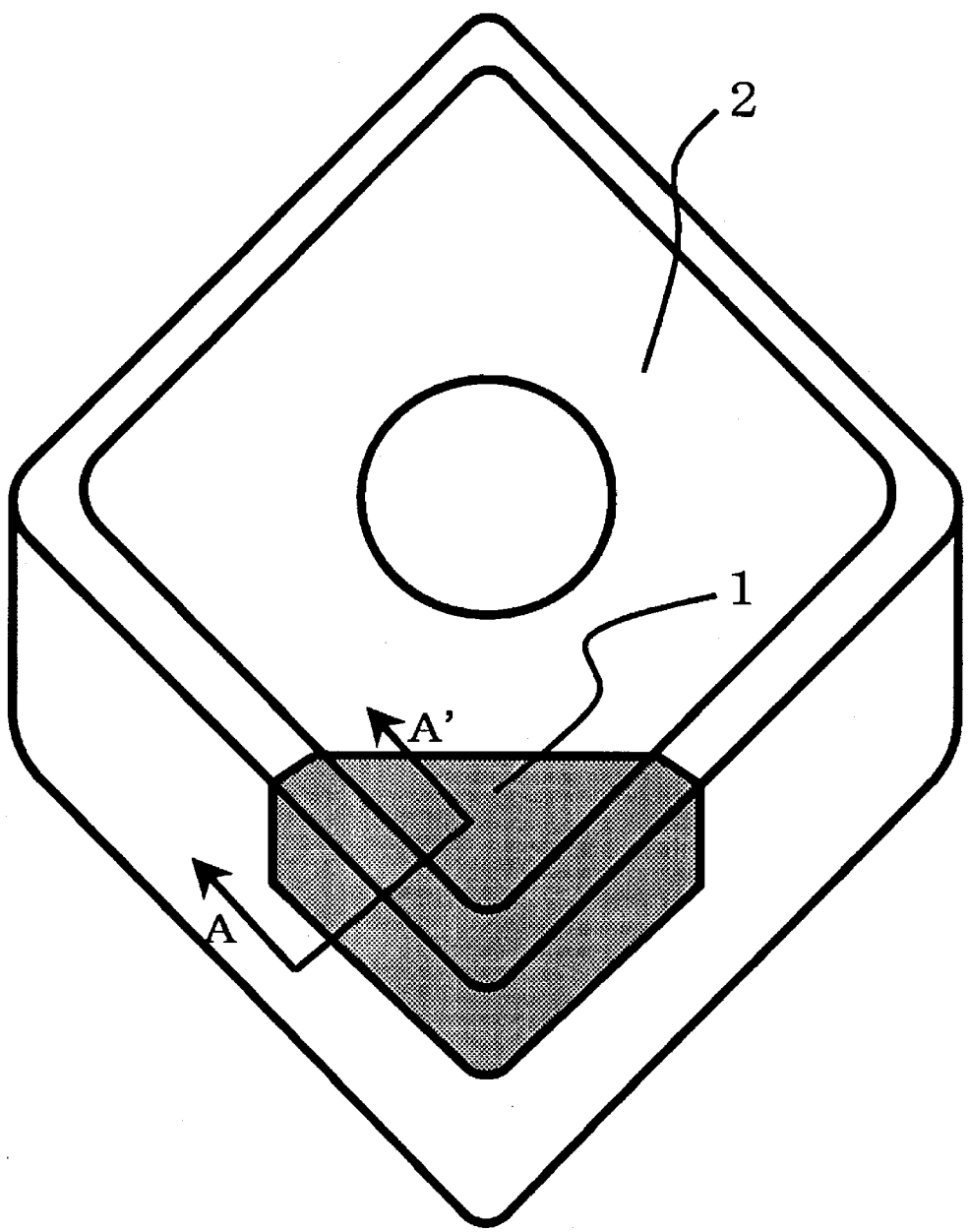
FIG. 1 This is a perspective view of the sintered cubic boron nitride tool of the present invention.
Figure 2:
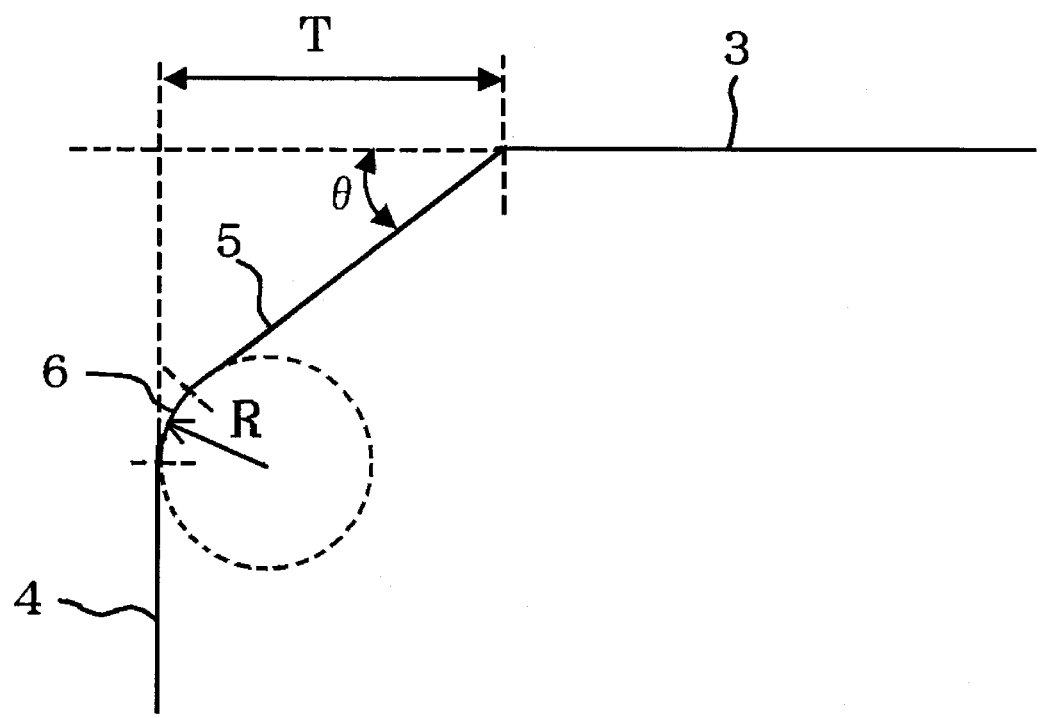
FIG. 2 This is a sectional view at A-A' line of the sintered cubic boron nitride tool of the present invention.
Figure 3:
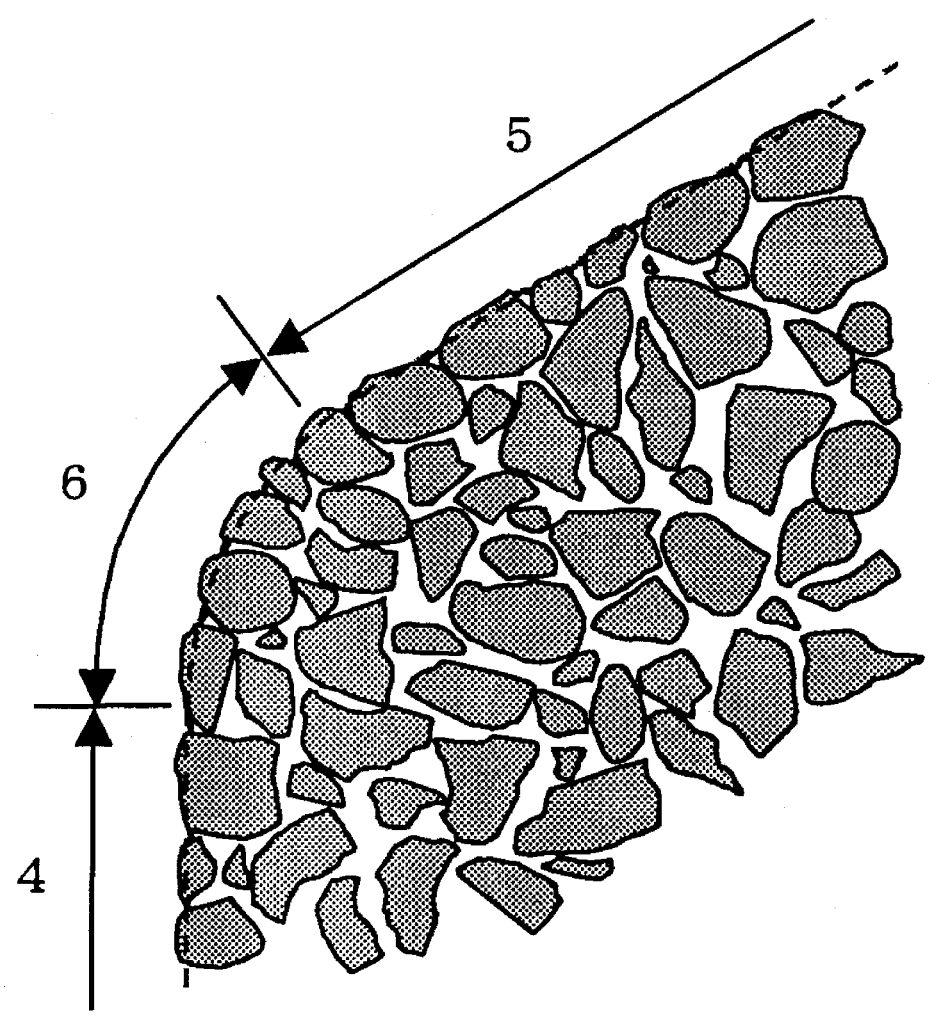
FIG. 3 This is an enlarged view of the sectional surface of at A-A' line of the sintered cubic boron nitride tool of the present invention.
Figure 4:
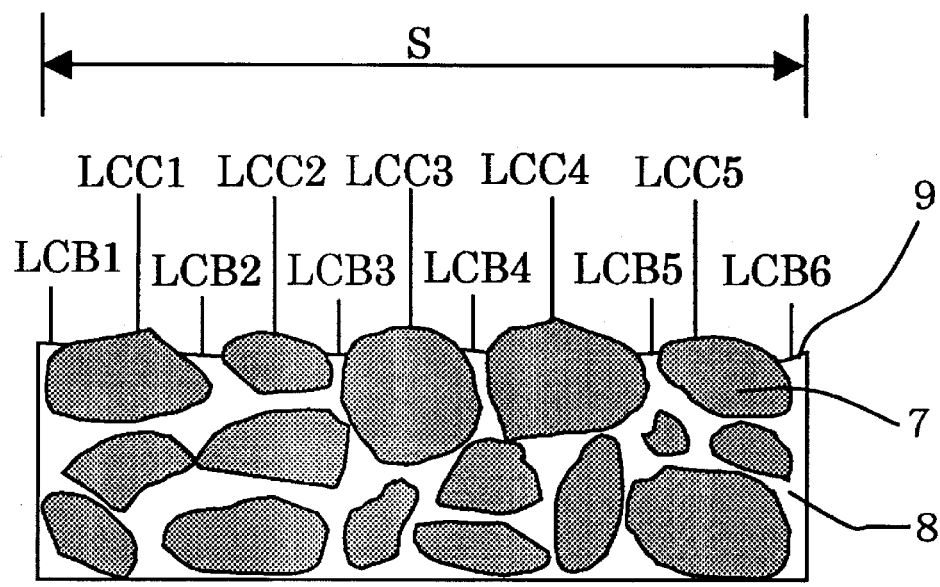
FIG. 4 This is an enlarged view of the sectional surface of a chamfer honing surface of the sintered cubic boron nitride tool of the present invention.
Figure 5:
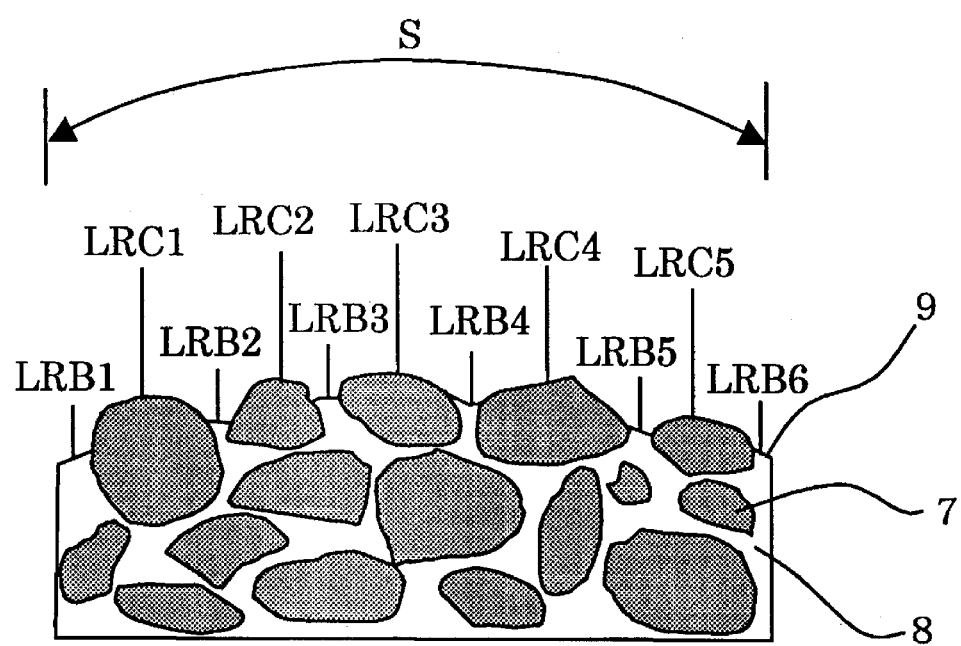
FIG. 5 This is an enlarged view of the sectional surface of a round honing surface of the sintered cubic boron nitride tool of the present invention.
Figure 6:
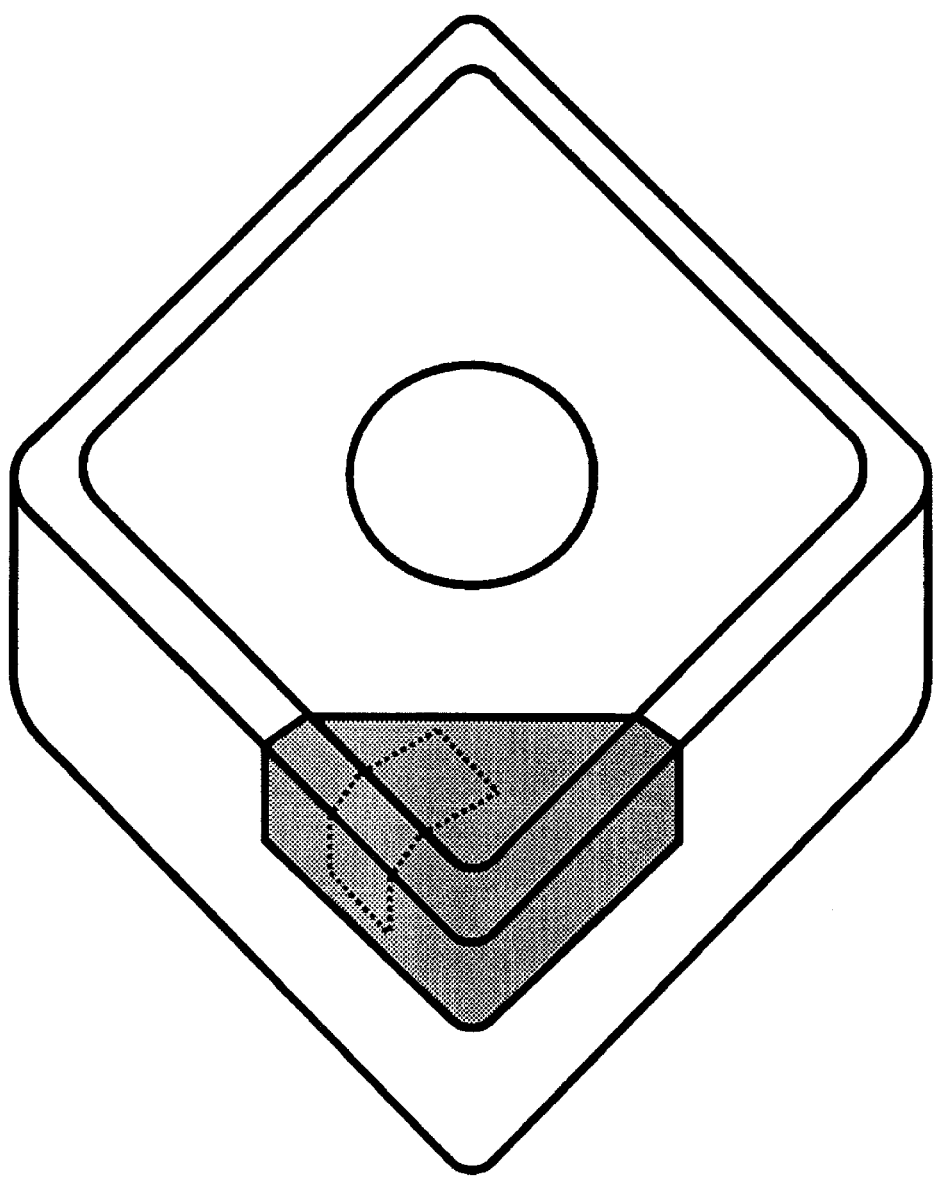
FIG. 6 This is a perspective view of the sintered cubic boron nitride tool of the present invention.
Figure 7:
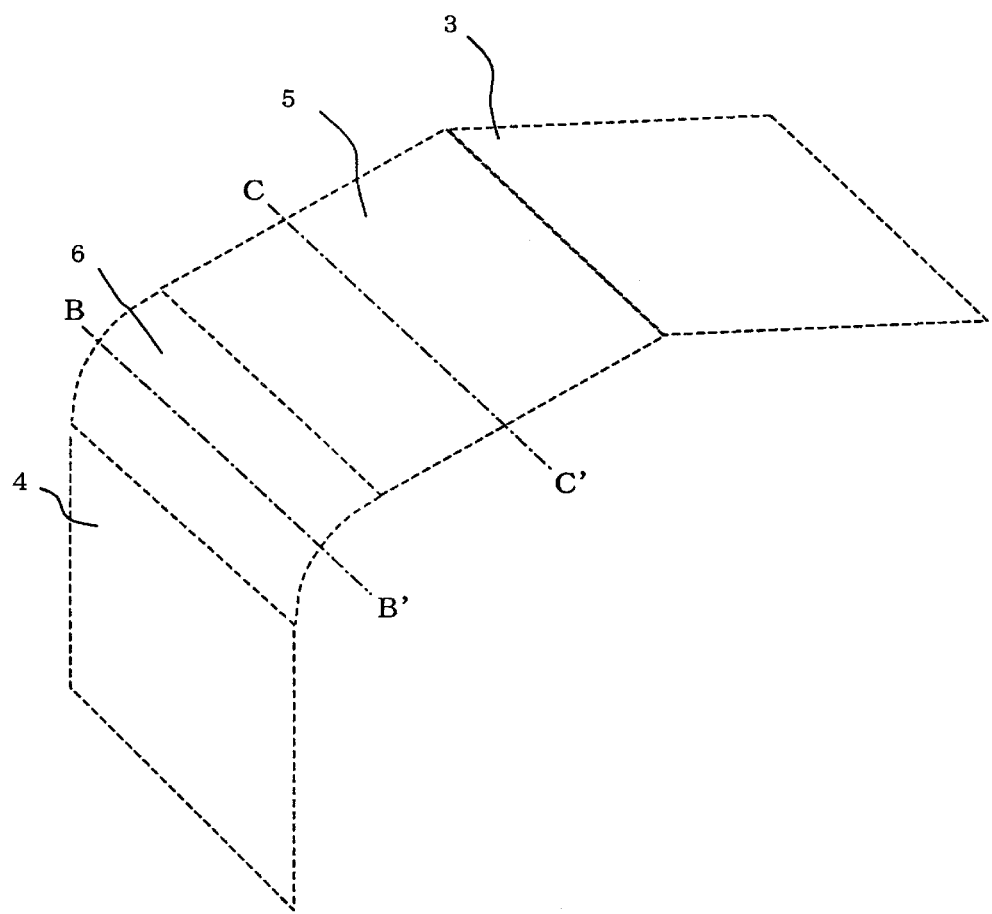
FIG. 7 This is an enlarged view of the dotted line portion (FIG. 6) of the sintered cubic boron nitride tool of the present invention.
Figure 8:
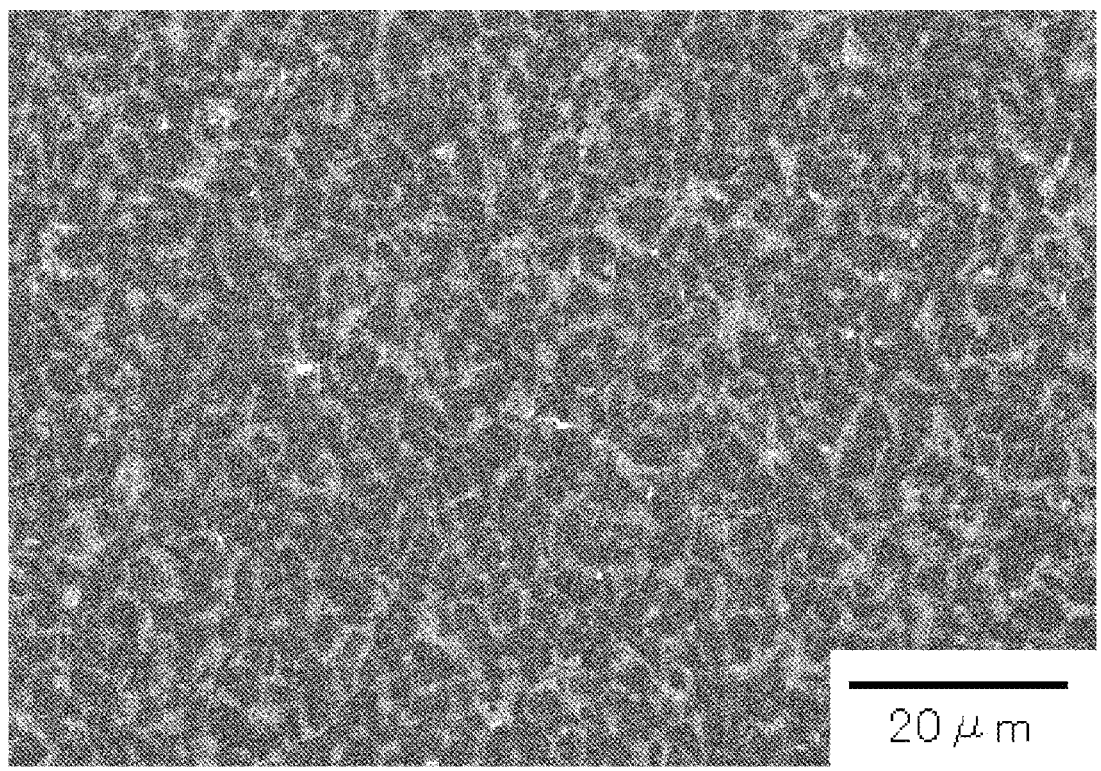
FIG. 8 This is an SEM photograph of the surface structure of the substrate after Ar ion etching treatment.
Figure 9:
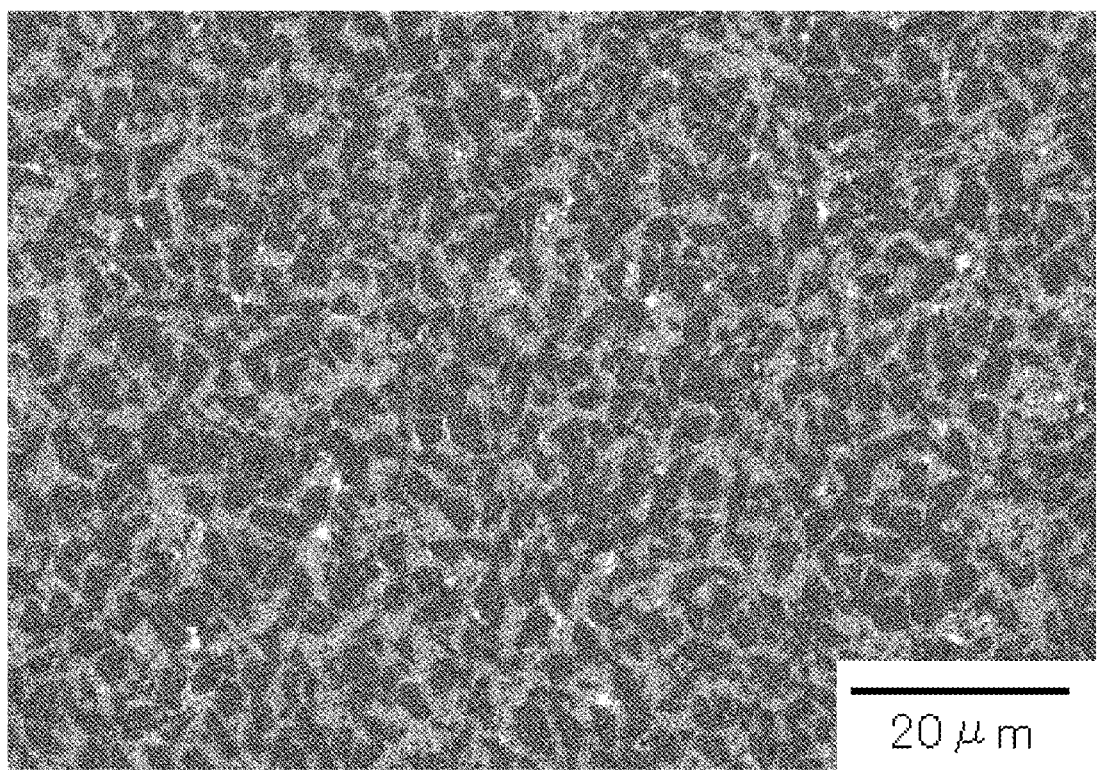
FIG. 9 This is an SEM photograph of the surface structure of the substrate before Ar ion etching treatment.

A mixed powder having a formulated composition comprising 75% by volume cBN-5% by volume Al-10% by volume $Al_2O_3$-10% by volume Ti(C,N) using cubic boron nitride powder having an average particle size of 1.0 μm was sintered under ultra-high temperature and high pressure with the conditions of a pressure of 5.5 GPa and a temperature of 1773K to obtain a cubic boron nitride sintered body. The obtained cubic boron nitride sintered body was made Substrate 1.

A hard alloy base metal with a shape of ISO standard CNGA120408 was prepared, and Substrate 1 was brazed at a corner portion which becomes a blade edge of the hard alloy base metal. A rake surface (upper and bottom surfaces) and a relief surface (peripheral surface) of the brazed tool was polished with a diamond whetstone of #270, subsequently, a chamfer honing surface was formed to an edge line portion formed by the rake surface and the relief surface with a chamfer honing width T of 0.10 mm and a chamfer honing angle θ of −25° by a diamond whetstone of #400. Moreover, a rotary brush was pressed to a blade edge portion of the tool, and a round honing machining was carried out at the edge line portion formed by the relief surface and the chamfer honing surface. At this time, while adjusting a machining time, the round honing machining was carried out so that a radius of curvature R became that as shown in Table 1 by measuring with a contracer. After the round honing machining, the tool was washed with ethanol and acetone, thereafter vacuum drying treatment was carried out. Surface treatment shown in Table 1 was carried out to Substrate 1 of the sintered cubic boron nitride tool by using a vacuum device which is equipped with a magnetron sputtering device and an ion etching device which employs a φ1 mm tungsten wire as a heat filament to obtain cutting tools of Present products 1 to 15 and Comparative products 1 to 6. Incidentally, the surface treatments of the substrate are to carry out coating of a metal film to the substrate or an ion etching (hereinafter referred to as "IE".), and specific surface treatment conditions are shown in Tables 2 and 3.

TABLE 1

| Sample No. | Substrate | Round honing Radius of curvature R (μm) | Surface treatment |
|---|---|---|---|
| Comparative product 1 | Substrate 1 | 30 | Condition 1 |
| Comparative product 2 | Substrate 1 | 30 | Condition 2 |
| Present product 1 | Substrate 1 | 30 | Condition 3 |
| Present product 2 | Substrate 1 | 30 | Condition 4 |
| Present product 3 | Substrate 1 | 30 | Condition 5 |
| Present product 4 | Substrate 1 | 30 | Condition 6 |
| Present product 5 | Substrate 1 | 30 | Condition 7 |
| Present product 6 | Substrate 1 | 30 | Condition 8 |
| Present product 7 | Substrate 1 | 30 | Condition 9 |
| Present product 8 | Substrate 1 | 30 | Condition 10 |
| Present product 9 | Substrate 1 | 30 | Condition 11 |
| Present product 10 | Substrate 1 | 30 | Condition 12 |
| Present product 11 | Substrate 1 | 30 | Condition 13 |
| Present product 12 | Substrate 1 | 30 | Condition 14 |
| Comparative product 3 | Substrate 1 | 30 | Condition 15 |
| Comparative product 4 | Substrate 1 | 30 | Condition 16 |
| Comparative product 5 | Substrate 1 | 4 | Condition 17 |

TABLE 1-continued

| Sample No. | Substrate | Round honing Radius of curvature R (μm) | Surface treatment |
|---|---|---|---|
| Present product 13 | Substrate 1 | 10 | Condition 17 |
| Present product 14 | Substrate 1 | 25 | Condition 17 |
| Present product 15 | Substrate 1 | 50 | Condition 17 |
| Comparative product 6 | Substrate 1 | 65 | Condition 17 |

TABLE 2

| Surface treatment | Steps | Treatment conditions |
|---|---|---|
| Condition 1 | No treatment | — |
| Condition 2 | Film formation | Film thickness 0.1 μm, Al metal film |
| | IE1 | Ar gas, bias voltage: 500 V, 30 min |
| | | Steps of Film formation→IE1 |
| Condition 3 | Film formation | Film thickness 0.1 μm, TiN film |
| | IE1 | Ar gas, bias voltage: 1200 V, 30 sec |
| | IE2 | Ar gas, bias voltage: 150 V, 12 min |
| | | Steps of Film formation→IE1→IE2 |
| Condition 4 | Film formation | Film thickness 0.2 μm, TiN film |
| | IE1 | Ar gas, bias voltage: 1300 V, 40 sec |
| | IE2 | Ar gas, bias voltage: 130 V, 18 min |
| | | Steps of Film formation→IE1→IE2 |
| Condition 5 | Film formation | Film thickness 0.2 μm, CrN film |
| | IE1 | Kr gas, bias voltage: 1300 V, 40 sec |
| | IE2 | Ne, Ar, Kr mixed gas, bias voltage: 120 V, 18 min |
| | | Steps of Film formation→IE1→IE2 Twice repeated |
| Condition 6 | Film formation | Film thickness 0.3 μm, CrN film |
| | IE1 | Ar gas, bias voltage: 1500 V, 40 sec |
| | IE2 | Ne, Ar, Kr mixed gas, bias voltage: 110 V, 22 min |
| | | Steps of Film formation→IE1→IE2 Twice repeated |
| Condition 7 | Film formation | Film thickness 0.4 μm, Al metal film |
| | IE1 | Ar gas, bias voltage: 1400 V, 30 sec |
| | IE2 | Ne, Ar, Kr mixed gas, bias voltage: 150 V, 7 min |
| | | Steps of Film formation→IE1→IE2 Three times repeated |
| Condition 8 | Film formation | Film thickness 0.4 um, Al metal film |
| | IE1 | Ar gas, bias voltage: 1500 V, 20 sec |
| | IE2 | Ne, Ar, Kr mixed gas, bias voltage: 140 V, 8 min |
| | | Steps of Film formation→IE1→IE2 Three times repeated |
| Condition 9 | Film formation | Film thickness 0.3 μm, Cr metal film |
| | IE1 | Kr gas, bias voltage: 1600 V, 30 sec |
| | IE2 | Ne, Ar, Kr mixed gas, bias voltage: 120 V, 10 min |
| | | Steps of Film formation→IE1→IE2 Three times repeated |
| Condition 10 | Film formation | Film thickness 0.4 μm, Cr metal film |
| | IE1 | Kr gas, bias voltage: 100 V, 15 min |
| | IE2 | Ne, Ar, Kr mixed gas, bias voltage: 100 V, 15 min |
| | | Steps of Film formation→IE1→IE2 Three times repeated |
| Condition 11 | Film formation | Film thickness 0.3 μm, Al metal film |
| | IE1 | Ar gas, bias voltage: 1300 V, 20 sec |
| | IE2 | Ne, Ar, Kr mixed gas, bias voltage: 90 V, 10 min |
| | | Steps of Film formation→IE1→IE2 Four times repeated |

TABLE 3

| Surface treatment | Steps | Treatment conditions |
|---|---|---|
| Condition 12 | Film formation | Film thickness 0.1 μm, Al metal film |
| | IE1 | Ar gas, bias voltage: 1500 V, 10 sec |
| | IE2 | Ne, Ar, Kr mixed gas, bias voltage: 50 V, 30 min |
| | | Steps of Film formation→IE1→IE2 Five times repeated |
| Condition 13 | Film formation | Film thickness 0.3 μm, Al metal film |
| | IE1 | Ar gas, bias voltage: 1350 V, 30 sec |
| | IE2 | Ne, Ar, Kr mixed gas, bias voltage: 150 V, 10 min |
| | | Steps of Film formation→IE1→IE2 Six times repeated |
| Condition 14 | Film formation | Film thickness 0.3 μm, Al metal film |
| | IE1 | Ar gas, bias voltage: 1600 V, 20 sec |
| | IE2 | Ne, Ar, Kr mixed gas, bias voltage: 160 V, 10 min |
| | | Steps of Film formation→IE1→IE2 Six times repeated |
| Condition 15 | Film formation | Film thickness 0.5 μm, TiN film |
| | IE1 | Ar gas, bias voltage: 2000 V, 1 min |
| | IE2 | Ne, Ar, Kr mixed gas, bias voltage: 400 V, 10 min |
| | | Steps of Film formation→IE1→IE2 Four times repeated |

TABLE 3-continued

| Surface treatment | Steps | Treatment conditions |
|---|---|---|
| Condition 16 | Film formation | Film thickness 0.5 μm, Al metal film |
| | IE1 | Ar gas, bias voltage: 2400 V, 40 sec |
| | IE2 | Ne, Ar, Kr mixed gas, bias voltage: 500 V, 10 min Steps of Film formation→IE1→IE2 Four times repeated |
| Condition 17 | Film formation | Film thickness 0.2 μm, Cr metal film |
| | IE1 | Kr gas, bias voltage: 1600 V, 20 sec |
| | IE2 | Ne, Ar, Kr mixed gas, bias voltage: 130 V, 8 min Steps of Film formation→IE1→IE2 Three times repeated |

With regard to the cutting tools of the obtained Present products 1 to 15 and Comparative products 1 to 6, a round honing surface, a chamfer honing surface and a cross-sectional surface at the inside of the sintered body were photographed by scanning electron microscope (SEM). An image of the cross-sectional photography was analyzed, an average particle size of the cubic boron nitride (cBN) was measured, and then, lengths of profile curve of the cubic boron nitride at the round honing surface and the chamfer honing surface, and the binder phase were each measured to obtain PR/PC, these values are shown in Table 4.

TABLE 4

| Sample No. | cBN average particle size (μm) | PR/PC | Cutting test First time (number) | Cutting test Second time (number) | Average (number) | Evaluation of performance |
|---|---|---|---|---|---|---|
| Comparative product 1 | 1.0 | 1.0 | 13 | 19 | 16 | X |
| Comparative product 2 | 1.0 | 1.1 | 28 | 22 | 25 | X |
| Present product 1 | 1.0 | 1.2 | 39 | 44 | 41.5 | ○ |
| Present product 2 | 1.0 | 1.3 | 44 | 45 | 44.5 | ○ |
| Present product 3 | 1.0 | 1.6 | 50 | 50 | 50 | ○ |
| Present product 4 | 1.0 | 1.9 | 52 | 51 | 51.5 | ○ |
| Present product 5 | 1.0 | 2.1 | 58 | 56 | 57 | ◎ |
| Present product 6 | 1.0 | 2.5 | 60 | 62 | 61 | ◎ |
| Present product 7 | 1.0 | 3.5 | 65 | 60 | 62.5 | ◎ |
| Present product 8 | 1.0 | 5.0 | 58 | 60 | 59 | ◎ |
| Present product 9 | 1.0 | 5.5 | 54 | 50 | 51.5 | ○ |
| Present product 10 | 1.0 | 6.0 | 48 | 52 | 50 | ○ |
| Present product 11 | 1.0 | 7.0 | 45 | 41 | 43 | ○ |
| Present product 12 | 1.0 | 8.0 | 44 | 40 | 42 | ○ |
| Comparative product 3 | 1.0 | 10 | 24 | 28 | 26 | X |
| Comparative product 4 | 1.0 | 14 | 18 | 8 | 13 | X |
| Comparative product 5 | 1.0 | 3.0 | 21 | 27 | 24 | X |
| Present product 13 | 1.0 | 3.0 | 58 | 57 | 57.5 | ◎ |
| Present product 14 | 1.0 | 3.0 | 66 | 63 | 64.5 | ◎ |
| Present product 15 | 1.0 | 3.0 | 56 | 60 | 58 | ◎ |
| Comparative product 6 | 1.0 | 3.0 | 25 | 29 | 27 | X |

With regard to cutting tools of Present products 1 to 15 and Comparative products 1 to 6, Cutting test 1 was carried out.
[Cutting Test 1]
Kind of cutting machining: Outer diameter heavy interrupt cutting
Material to be cut: SCM420H (Carburized and hardened material)
Hardness of material to be cut: HRC60 to 62
Shape of material to be cut: Substantially disc shape with grooves (Outer diameter: 100 mm, Thickness: 11 mm), disconnected portions are 24
Cutting rate: 200 (m/min)
Feed: 0.12 (mm/rev)
Depth of cut: 0.18 (mm)
Number of repeated times: Twice
Lifetime judgment: Number of machining until defect occurs
The results of Cutting test 1 were shown in Table 4. Incidentally, from a number of machined materials, the results are shown by good cutting performance to bad one in the order of ◎, ○, X (In the following cutting tests, similarly shown). From the results, it can be understood that Present products are increased in a number of machining 1.5 times or more as compared with those of Comparative products.

Example 2

By using cubic boron nitride powder having an average particle size of 1.5 μm, a mixed powder with the formulation composition shown in Table 5 was sintered under ultra-high temperature and high pressure with the conditions of a pressure of 5.5 GPa and a temperature of 1773K to obtain a cubic boron nitride sintered body. The obtained cubic boron nitride sintered body was made Substrates 2 to 10. ISO standard CNGA120408 shape hard alloy base metal was prepared, and each cubic boron nitride sintered body of Substrates 2 to 10 was brazed to the corner portion thereof which is a blade edge of the hard alloy base metal.

TABLE 5

| Substrate | Formulation composition of cubic boron nitride sintered body (% by volume) |
|---|---|
| Substrate 2 | 30cBN—10Al—25Al$_2$O$_3$—10Ti(C,N)—5(Ti,Hf)N—10WC—5Co—2Ni—3 Mg |
| Substrate 3 | 40cBN—10Al—30Al$_2$O$_3$—3WC—13Ti(C,N)—1Si—1Mg—2Co |
| Substrate 4 | 50cBN—10Al—25Al$_2$O$_3$—15Ti(C,N) |
| Substrate 5 | 55cBN—5Al—25Al$_2$O$_3$—3TiB$_2$—10TiN—2ZrN |

TABLE 5-continued

| Substrate | Formulation composition of cubic boron nitride sintered body (% by volume) |
|---|---|
| Substrate 6 | 60cBN—10Al—20Al$_2$O$_3$—10TiN |
| Substrate 7 | 70cBN—5Al—15Al$_2$O$_3$—8WC—2Co |
| Substrate 8 | 80cBN—5Al—5Al$_2$O$_3$—10TiN |
| Substrate 9 | 90cBN—7Al—2WC—1Co |
| Substrate 10 | 95cBN—2Al$_2$O$_3$—1TiN—1WC—1Co |

Each of a rake surface (upper and bottom surfaces) and a relief surface (peripheral surface) of the tools in which each cubic boron nitride sintered body of Substrates 2 to 10 had been brazed was polished by a #270 diamond whetstone, subsequently, a chamfer honing surface was formed to an edge line portion formed by the rake surface and the relief surface with a chamfer honing width T of 0.20 mm and a chamfer honing angle θ of −30° by a #600 diamond whetstone. Moreover, a rotary brush was pressed to a blade edge portion of the tool, to carry out round honing machining at the edge line portion formed by the relief surface and the chamfer honing surface. At this time, while adjusting a machining time, measurement was carried out by a contracer, and round honing machining was carried out so that the radius of curvature R became 30 μm. After the round honing machining, each tool was washed with ethanol and acetone, thereafter vacuum drying treatment was carried out. Surface treatment shown in Table 6 was carried out to each of Substrates 2 to 10 of the sintered cubic boron nitride tools by using a vacuum device which is equipped with a magnetron sputtering device and an ion etching device which employs a φ 1 mm tungsten wire as a heat filament to obtain cutting tools of Present products 16 to 24 and Comparative products 7 and 8. Specific surface treatment conditions were shown in Table 7. Incidentally, Condition 1 of the surface treatment means that no surface treatment of Substrates was carried out.

TABLE 6

| Sample No. | Substrate | Surface treatment |
|---|---|---|
| Present product 16 | Substrate 2 | Condition 18 |
| Present product 17 | Substrate 3 | Condition 18 |
| Present product 18 | Substrate 4 | Condition 18 |
| Present product 19 | Substrate 5 | Condition 18 |
| Present product 20 | Substrate 6 | Condition 18 |
| Present product 21 | Substrate 7 | Condition 18 |
| Present product 22 | Substrate 8 | Condition 18 |
| Present product 23 | Substrate 9 | Condition 18 |
| Present product 24 | Substrate 10 | Condition 18 |
| Comparative product 7 | Substrate 6 | Condition 1 |
| Comparative product 8 | Substrate 6 | Condition 19 |

TABLE 7

| Surface treatment | Steps | Treatment conditions |
|---|---|---|
| Condition 1 | No treatment | — |
| Condition 18 | Film formation | Film thickness 0.3 μm, Cr metal film |
| | IE1 | Kr gas, bias voltage: 1700 V, 30 sec |
| | IE2 | Ne, Ar, Kr mixed gas, bias voltage: 110 V, 12 min Steps of Film formation→IE1→IE2 Three times repeated |
| Condition 19 | Film formation | Film thickness 0.6 μm, TiN film |
| | IE1 | Ar gas, bias voltage: 2200 V, 1 min |
| | IE2 | Ne, Ar, Kr mixed gas, bias voltage: 450 V, 12 min Steps of Film formation→IE1→IE2 Four times repeated |

With regard to the cutting tools of the obtained Present products 16 to 24 and Comparative products 7 and 8, a round honing surface, a chamfer honing surface and a cross-sectional surface at the inside of the sintered body were photographed by a scanning electron microscope (SEM). An image of the cross-sectional photography was analyzed, and after an average particle size of the cubic boron nitride (cBN) was measured, the cubic boron nitrides of the round honing surface and the chamfer honing surface, and lengths of profile curve of the binder phase were each measured to obtain PR/PC, and these values were shown in Table 8.

TABLE 8

| Sample No. | cBN average particle size (μm) | PR/PC | Cutting test First time (min) | Cutting test Second time (min) | Cutting test Average (min) | Main damaged state | Evaluation of performance |
|---|---|---|---|---|---|---|---|
| Present product 16 | 1.5 | 4.8 | 22.5 | 21.3 | 21.9 | Blade edge minor chipping | ○ |
| Present product 17 | 1.5 | 4.3 | 25.9 | 27.3 | 26.6 | Blade edge minor chipping | ○ |
| Present product 18 | 1.5 | 4.1 | 30 | 30 | 30 | Normal wear | ◎ |
| Present product 19 | 1.5 | 3.9 | 26.4 | 28.2 | 27.3 | Blade edge minor chipping | ○ |
| Present product 20 | 1.5 | 3.5 | 30 | 30 | 30 | Normal wear | ◎ |
| Present product 21 | 1.5 | 3.1 | 29 | 27.5 | 28.3 | Blade edge minor chipping | ○ |
| Present product 22 | 1.5 | 2.9 | 30 | 30 | 30 | Normal wear | ◎ |
| Present product 23 | 1.5 | 2.7 | 26.7 | 26.5 | 26.6 | Blade edge minor chipping | ○ |
| Present product 24 | 1.5 | 2.5 | 20.9 | 21.9 | 21.4 | Blade edge minor chipping | ○ |

TABLE 8-continued

| Sample No. | cBN average particle size (μm) | PR/PC | Cutting test | | | | Evaluation of performance |
|---|---|---|---|---|---|---|---|
| | | | First time (min) | Second time (min) | Average (min) | Main damaged state | |
| Comparative product 7 | 1.5 | 1.0 | 10.2 | 7.5 | 8.9 | Blade edge deficit | X |
| Comparative product 8 | 1.5 | 12 | 10.9 | 10.3 | 10.6 | Blade edge deficit | X |

With regard to the cutting tools of Present products 16 to 24 and Comparative products 7 and 8, Cutting test 2 was carried out.

[Cutting Test 2]

Kind of cutting machining: Outer diameter heavy interrupt cutting
Material to be cut: SCM435H (Carburized and hardened material)
Hardness of material to be cut: HRC60 to 62
Shape of material to be cut: Substantially cylindrical shaped with an outer diameter: 80 mm, disconnected portions are 2
Cutting rate: 110 (m/min)
Feed: 0.2 (mm/rev)
Depth of cut: 0.2 (mm)
Number of repeated times: Twice
Lifetime judgment: Processing time (min) until chipping or defect occurs.

The results of Cutting test 2 are shown in Table 8. Present products showed twice or more lifetime than those of Comparative products. Among these, Present products 17 to 23 are particularly good, and further Present products 18, 20 and 22 were still possible to carry out cutting even after machining time of 30 min, and improved in lifetime about 3-folds of Comparative products 7 and 8.

Example 3

By using the cubic boron nitride powder having an average particle size shown in Table 9, a mixed powder having a formulation composition comprising 65% by volume cBN-10% by volume Al-15% by volume $Al_2O_3$-10% by volume TiN was subjected to ultra-high temperature and high pressure under the conditions of a pressure of 5.5 GPa and a temperature of 1773K to obtain each cubic boron nitride sintered body. The obtained cubic boron nitride sintered bodies were made Substrates 11 to 20. ISO standard CNGA120408 shaped hard alloy base metal was prepared, and each cubic boron nitride sintered body of Substrates 11 to 20 was brazed to the corner portion which is a blade edge of the hard alloy base metal.

TABLE 9

| Substrate | Average particle size of cubic boron nitride particle (μm) |
|---|---|
| Substrate 11 | 0.1 |
| Substrate 12 | 0.3 |
| Substrate 13 | 1.0 |
| Substrate 14 | 1.5 |
| Substrate 15 | 2.0 |

TABLE 9-continued

| Substrate | Average particle size of cubic boron nitride particle (μm) |
|---|---|
| Substrate 16 | 3.5 |
| Substrate 17 | 4.0 |
| Substrate 18 | 5.0 |
| Substrate 19 | 6.0 |
| Substrate 20 | 6.5 |

Each of a rake surface (upper and bottom surfaces) and a relief surface (peripheral surface) of the tools in which cubic boron nitride sintered bodies of Substrates 11 to 20 had been brazed was polished by a #270 diamond whetstone, subsequently, a chamfer honing surface was formed to an edge line portion formed by the rake surface and the relief surface with a chamfer honing width T of 0.23 mm and a chamfer honing angle θ of −20° by a #600 diamond whetstone. Moreover, a rotary brush was pressed to a blade edge portion of the tool, to carry out round honing machining at the edge line portion formed by the relief surface and the chamfer honing surface. At this time, while adjusting a machining time, measurement was carried out by a contracer, and round honing machining was carried out so that the radius of curvature R became 30 μm. After the round honing machining, each tool was washed with ethanol and acetone, thereafter vacuum drying treatment was carried out. Surface treatment shown in Table 10 was carried out to each of Substrates 11 to 20 of the sintered cubic boron nitride tools by using a vacuum device which is equipped with a magnetron sputtering device and an ion etching device which employs a ϕ 1 mm tungsten wire as a heat filament to obtain cutting tools of Present products 25 to 34 and Comparative products 9 and 10. Conditions 18 and 19 of the surface treatment are the same conditions as Conditions 18 and 19 of the surface treatment in Example 2, respectively. Incidentally, Condition 1 of the surface treatment means that no surface treatment of Substrates was carried out. Incidentally, Condition 1 means not to carry out the surface treatment of the substrate.

TABLE 10

| Sample No. | Substrate | Surface treatment |
|---|---|---|
| Present product 25 | Substrate 11 | Condition 18 |
| Present product 25 | Substrate 12 | Condition 18 |
| Present product 27 | Substrate 13 | Condition 18 |
| Present product 28 | Substrate 14 | Condition 18 |
| Present product 29 | Substrate 15 | Condition 18 |
| Present product 30 | Substrate 16 | Condition 18 |
| Present product 31 | Substrate 17 | Condition 18 |
| Present product 32 | Substrate 18 | Condition 18 |
| Present product 33 | Substrate 19 | Condition 18 |
| Present product 34 | Substrate 20 | Condition 18 |
| Comparative product 9 | Substrate 14 | Condition 1 |
| Comparative product 10 | Substrate 14 | Condition 19 |

With regard to the obtained cutting tools of Present products 25 to 34 and Comparative products 9 and 10, each sectional surface at the inside the substrate was prepared and observation of the sectional surface was carried out by a scanning electron microscope (SEM), an average particle size of the cubic boron nitride (cBN) was measured, and the values are shown in Table 11. Further, sectional surfaces of the round honing surface and the chamfer honing surface were photographed by a scanning electron microscope (SEM). An image of the sectional photograph was analyzed, the cubic boron nitrides of the round honing surface and the chamfer honing surface, and lengths of profile curve of the binder phase were each measured to obtain PR/PC, and the values are shown in Table 11.

TABLE 11

| Sample No. | cBN average particle size (μm) | PR/PC | Cutting test | | | | Evaluation of performance |
|---|---|---|---|---|---|---|---|
| | | | First time (min) | of time (min) | Average (min) | Main damaged state | |
| Present product 25 | 0.1 | 2.5 | 15.2 | 15.7 | 15.5 | Blade edge minor chipping | ○ |
| Present product 26 | 0.3 | 2.6 | 17.8 | 18.3 | 18.1 | Chipping | ○ |
| Present product 27 | 1.0 | 2.9 | 18.3 | 18.6 | 16.5 | Blade edge minor chipping | ○ |
| Present product 28 | 1.5 | 3.2 | 19.6 | 20 | 19.8 | Blade edge minor chipping | ◎ |
| Present product 29 | 2.0 | 3.5 | 20 | 20 | 20 | Normal wear | ◎ |
| Present product 30 | 3.5 | 4.0 | 20 | 20 | 20 | Normal wear | ◎ |
| Present product 31 | 4.0 | 4.2 | 20 | 20 | 20 | Normal wear | ◎ |
| Present product 32 | 5.0 | 4.6 | 20 | 19.8 | 19.9 | Blade edge minor chipping | ◎ |
| Present product 33 | 6.0 | 4.8 | 17.7 | 18.3 | 18 | Blade edge minor chipping | ○ |
| Present product 34 | 6.5 | 4.9 | 14.9 | 15.3 | 15.1 | Chipping | ○ |
| Comparative product 9 | 1.5 | 1.0 | 7.4 | 9.9 | 8.7 | Blade edge deficit | X |
| Comparative product 10 | 1.5 | 12 | 10.1 | 9.3 | 9.7 | Blade edge deficit | X |

With regard to the cutting tools of Present products 25 to 34 and Comparative products 9 and 10, Cutting test 3 was carried out.

[Cutting Test 3]

Kind of cutting machining: Outer diameter heavy interrupt cutting

Material to be cut: SCM415H (Carburized and hardened material)

Hardness of material to be cut: HRC59 to 62

Shape of material to be cut: substantially cylindrical shaped with an Outer diameter: 80 mm, disconnected portions are 2

Cutting rate: 140 (m/min)

Feed: 0.15 (mm/rev)

Depth of cut: 0.5 (mm)

Number of repeated times: Twice

Lifetime judgment: machining time (min) until chipping or defect occurs. Provided that the maximum was made 20 min.

The results of Cutting test 3 are shown in Table 11. Present products showed 1.5-times or more lifetime than those of Comparative products. Among Present products, the cubic boron nitrides having an average particle size of 1.5 to 5 μm were particularly good, and showed a lifetime of 2-fold or more than those of Comparative products.

Example 4

By using a cubic boron nitride powder having an average particle size of 3.0 μm, a mixed powder having a formulation composition comprising 55% by volume cBN-10% by volume Al-20% by volume $Al_2O_3$-15% by volume TiN was subjected to ultra-high temperature and high pressure under the conditions of a pressure of 5.5 GPa and a temperature of 1773K to obtain a cubic boron nitride sintered body. The obtained cubic boron nitride sintered body was made a substrate 21.

ISO standard CNGA120408 shaped hard alloy base metal was prepared, and Substrate 21 was brazed to the corner portion which is a blade edge of the hard alloy base metal. A rake surface (upper and bottom surfaces) and a relief surface (peripheral surface) of the brazed tool was polished by a #270 diamond whetstone, subsequently, a chamfer honing surface was formed to an edge line portion formed by the rake surface and the relief surface with a chamfer honing width T of 0.26 mm and a chamfer honing angle θ of −18° by a #600 diamond whetstone. Moreover, a rotary brush was pressed to a blade edge portion of the tool, to carry out round honing machining at the edge line portion formed by the relief surface and the chamfer honing surface. At this time, while adjusting a machining time, measurement was carried out by a contracer, and round honing machining was carried out so that the radius of curvature R became 30 μm. After round honing machining, the tool was washed with ethanol and acetone, thereafter vacuum drying treatment was carried out. Surface treatment shown in Table 12 was carried out to Substrate 21 of the sintered cubic boron nitride tool by using a vacuum device which is equipped with a magnetron sputtering device and an ion etching device which employs a φ 1 mm tungsten wire as a heat filament, and a coating film shown in Table 12 was formed by using an arc ion plating electrode except for a part of the samples to obtain cutting tools of Present products 35 to 58 and Comparative products 11 to 14. Specific surface treatment conditions are shown in Table 13. Incidentally, Condition 1 means not to carry out the surface treatment of the substrate. Also, specific coating conditions are shown in Table 14.

TABLE 12

| Sample No. | Substrate | Surface treatment | Coating film |
|---|---|---|---|
| Comparative product 11 | Substrate 21 | Condition 1 | No film |
| Comparative product 12 | Substrate 21 | Condition 1 | Coating film 11 |
| Comparative product 13 | Substrate 21 | Condition 20 | No film |
| Comparative product 14 | Substrate 21 | Condition 20 | Coating film 18 |
| Present product 35 | Substrate 21 | Condition 21 | No film |
| Present product 36 | Substrate 21 | Condition 21 | Coating film 1 |
| Present product 37 | Substrate 21 | Condition 21 | Coating film 2 |

TABLE 12-continued

| Sample No. | Substrate | Surface treatment | Coating film |
|---|---|---|---|
| Present product 38 | Substrate 21 | Condition 21 | Coating film 3 |
| Present product 39 | Substrate 21 | Condition 21 | Coating film 4 |
| Present product 40 | Substrate 21 | Condition 21 | Coating film 5 |
| Present product 41 | Substrate 21 | Condition 21 | Coating film 6 |
| Present product 42 | Substrate 21 | Condition 21 | Coating film 7 |
| Present product 43 | Substrate 21 | Condition 21 | Coating film 8 |
| Present product 44 | Substrate 21 | Condition 21 | Coating film 9 |
| Present product 45 | Substrate 21 | Condition 21 | Coating film 10 |
| Present product 46 | Substrate 21 | Condition 21 | Coating film 11 |
| Present product 47 | Substrate 21 | Condition 21 | Coating film 12 |
| Present product 48 | Substrate 21 | Condition 21 | Coating film 13 |
| Present product 49 | Substrate 21 | Condition 21 | Coating film 14 |
| Present product 50 | Substrate 21 | Condition 21 | Coating film 15 |
| Present product 51 | Substrate 21 | Condition 21 | Coating film 16 |
| Present product 52 | Substrate 21 | Condition 21 | Coating film 17 |
| Present product 53 | Substrate 21 | Condition 21 | Coating film 18 |
| Present product 54 | Substrate 21 | Condition 21 | Coating film 19 |
| Present product 55 | Substrate 21 | Condition 21 | Coating film 20 |
| Present product 56 | Substrate 21 | Condition 21 | Coating film 21 |
| Present product 57 | Substrate 21 | Condition 21 | Coating film 22 |
| Present product 58 | Substrate 21 | Condition 21 | Coating film 23 |

TABLE 13

| Surface treatment | Steps | Treatment conditions |
|---|---|---|
| Condition 1 | No treatment | — |
| Condition 20 | Film formation | Film thickness 0.4 µm, TiN film |
| | IE1 | Ar gas, bias voltage: 2300 V, 40 sec |
| | IE2 | Ne, Ar, Kr mixed gas, bias voltage: 500 V, 10 min |
| | | Steps of Film formation→IE1→IE2 Four times repeated |
| Condition 21 | Film formation | Film thickness 0.3 µm, Ti metal film |
| | IE1 | Ar gas, bias voltage: 1550 V, 30 sec |
| | IE2 | Ne, Ar, Kr mixed gas, bias voltage: 110 V, 11 min |
| | | Steps of Film formation→IE1→IE2 Three times repeated |

TABLE 14

| Coating film | Membrane constitution of Coating film (Thickness and composition) | Crystal form of film directly on cubic boron nitride sintered body |
|---|---|---|
| Coating film 1 | 1 µm DLC (Carbon film) | Amorphous |
| Coating film 2 | 6 µm TiN | Cubic |
| Coating film 3 | 5 µm CrN | Cubic |
| Coating film 4 | 3 µm Ti($C_{0.4}N_{0.5}O_{0.1}$) | Cubic |
| Coating film 5 | 4 µm ($Ti_{0.3}Nb_{0.7}$)N | Cubic |
| Coating film 6 | 2 µm ($Al_{0.6}Cr_{0.3}Si_{0.1}$)N | Cubic |
| Coating film 7 | 6 µm AlN | Hexagonal |
| Coating film 8 | 4 µm $Al_2O_3$-2 µm TiN | Hexagonal |
| Coating film 9 | 3 µm TiN-2 µm ($Al_{0.6}Cr_{0.4}$)$_2O_3$ | Cubic |
| Coating film 10 | 2 µm ($Ti_{0.7}Al_{0.3}$)($C_{0.1}N_{0.89}O_{0.01}$) | Cubic |
| Coating film 11 | 0.3 µm TiN-3 µm ($Ti_{0.3}Al_{0.7}$)N | Cubic |
| Coating film 12 | 3 µm ($Ti_{0.4}Al_{0.6}$)N | Cubic |
| Coating film 13 | 3 µm ($Ti_{0.25}Al_{0.7}W_{0.05}$)N | Cubic |
| Coating film 14 | 3 µm ($Ti_{0.49}Al_{0.5}Y_{0.01}$)N | Cubic |
| Coating film 15 | 5 µm ($Ti_{0.35}Al_{0.64}V_{0.005}Hf_{0.005}$)($C_{0.2}N_{0.8}$) | Cubic |
| Coating film 16 | 0.5 µm ($Ti_{0.5}Al_{0.5}$)N-3 µm ($Ti_{0.4}Al_{0.52}Nb_{0.08}$)N-0.5 µm ($Ti_{0.5}Al_{0.5}$)N | Cubic |
| Coating film 17 | 0.2 µm TiN-3 µm ($Ti_{0.8}Al_{0.1}Z_{0.05}B_{0.05}$)N-0.8 µm Ti($C_{0.4}N_{0.6}$) | Cubic |
| Coating film 18 | 3 µm ($Ti_{0.57}Al_{0.4}M_{0.03}$)N-1 µm ($Ti_{0.8}Si_{0.2}$)N | Cubic |
| Coating film 19 | 3 µm ($Ti_{0.4}Al_{0.598}Zr_{0.002}$)($N_{0.95}O_{0.05}$) | Cubic |
| Coating film 20 | 3 µm ($Ti_{0.35}Al_{0.5}Cr_{0.1}Si_{0.05}$)N-0.5 µm ZrN | Cubic |
| Coating film 21 | [5 nm ($Ti_{0.6}Al_{0.3}Zr_{0.1}$)N-5 nm ($Ti_{0.3}Al_{0.7}$)N (Layer-laminating cycle 10 nm)] × 300 layers (Total film thickness: 3 µm) | Cubic |
| Coating film 22 | [0.5 nm ($Ti_{0.3}Al_{0.6}Cr_{0.1}$)N-0.5 nm ($Al_{0.55}Cr_{0.4}B_{0.05}$)N (Layer-laminating cycle 1 nm)] × 2000 layers (Total film thickness: 2 µm) | Cubic |
| Coating film 23 | [18 nm ($Ti_{0.5}Al_{0.47}Si_{0.03}$)N-12 nm ($Ti_{0.35}Al_{0.65}$)N (Layer-laminating cycle 30 nm)] × 150 layers (Total film thickness: 4.5 µm) | Cubic |

Note)
Membrane constitution shows that left side is substrate side and right side is surface side. Note)
Composition shows atomic ratio. For example, $Ti_{0.3}Nb_{0.7}$ means Ti:Nb = 0.3:0.7 (atomic ratio).

With regard to the cutting tools of the obtained Present products 35 to 58 and Comparative products 11 to 14, a round honing surface, chamfer honing surface and a cross-sectional surface at the inside of the sintered body were photographed by scanning electron microscope (SEM). An image of the sectional photograph was analyzed, and after an average particle size of the cubic boron nitride (cBN) was measured, the cubic boron nitrides of the round honing surface and the chamfer honing surface, and lengths of profile curve of the binder phase were each measured to obtain PR/PC, and the values are shown in Table 15.

TABLE 15

| Sample No. | cBN average particle size (μm) | PR/PC | Cutting test First time (min) | Second time (min) | Third time (min) | Average (min) | Evaluation of performance |
|---|---|---|---|---|---|---|---|
| Comparative product 11 | 3.0 | 1.0 | 2.5 | 4.3 | 5 | 3.9 | X |
| Comparative product 12 | 3.0 | 1.0 | 4.2 | 3.2 | 5.5 | 4.3 | X |
| Comparative product 13 | 3.0 | 13 | 6.4 | 6 | 7.6 | 6.7 | X |
| Comparative product 14 | 3.0 | 13 | 7.3 | 8.6 | 5.5 | 7.1 | X |
| Present product 35 | 3.0 | 3.1 | 15.9 | 16.9 | 15.6 | 16.1 | ◯ |
| Present product 36 | 3.0 | 3.1 | 18.0 | 17.3 | 18.5 | 17.9 | ◯ |
| Present product 37 | 3.0 | 3.1 | 22.3 | 24.8 | 22.8 | 23.3 | ◯ |
| Present product 38 | 3.0 | 3.1 | 23.7 | 24.1 | 21.4 | 23.1 | ◯ |
| Present product 39 | 3.0 | 3.1 | 25.5 | 23.9 | 25.1 | 24.8 | ◯ |
| Present product 40 | 3.0 | 3.1 | 24.5 | 23 | 25.9 | 24.5 | ◯ |
| Present product 41 | 3.0 | 3.1 | 26.2 | 24.7 | 25.4 | 25.4 | ◯ |
| Present product 42 | 3.0 | 3.1 | 19.3 | 18.9 | 19.8 | 19.3 | ◯ |
| Present product 43 | 3.0 | 3.1 | 19.6 | 20.7 | 20.1 | 20.1 | ◯ |
| Present product 44 | 3.0 | 3.1 | 25.9 | 25.7 | 26.2 | 25.9 | ◯ |
| Present product 45 | 3.0 | 3.1 | 27.5 | 28.4 | 28 | 28 | ◎ |
| Present product 46 | 3.0 | 3.1 | 28.5 | 27.8 | 29.1 | 28.5 | ◎ |
| Present product 47 | 3.0 | 3.1 | 28.3 | 28.0 | 28.8 | 28.4 | ◎ |
| Present product 48 | 3.0 | 3.1 | 30.5 | 30.1 | 30.8 | 30.5 | ◎ |
| Present product 49 | 3.0 | 3.1 | 30.2 | 31.7 | 30.9 | 30.9 | ◎ |
| Present product 50 | 3.0 | 3.1 | 30.4 | 32 | 31.3 | 31.2 | ◎ |
| Present product 51 | 3.0 | 3.1 | 29.8 | 31.7 | 32.0 | 31.0 | ◎ |
| Present product 52 | 3.0 | 3.1 | 31.6 | 30.2 | 30.6 | 30.8 | ◎ |
| Present product 53 | 3.0 | 3.1 | 31.8 | 32.3 | 32.5 | 32.2 | ◎ |
| Present product 54 | 3.0 | 3.1 | 29.7 | 30.3 | 29.3 | 29.8 | ◎ |
| Present product 55 | 3.0 | 3.1 | 33.6 | 32.7 | 33.2 | 33.2 | ◎ |
| Present product 56 | 3.0 | 3.1 | 37.7 | 34.1 | 35.9 | 35.9 | ◎ |
| Present product 57 | 3.0 | 3.1 | 34.3 | 34.9 | 35.2 | 34.8 | ◎ |
| Present product 58 | 3.0 | 3.1 | 36.4 | 35.4 | 33.9 | 35.2 | ◎ |

With regard to cutting tools of Present products 35 to 58 and Comparative products 11 to 14, Cutting test 4 was carried out.

[Cutting Test 4]
Kind of cutting machining: Outer diameter heavy interrupt cutting
Material to be cut: SCM435H (Carburized and hardened material)
Hardness of material to be cut: HRC58 to 61
Shape of material to be cut: substantially cylindrical shaped with an outer diameter: 48 mm, disconnected portions are 2
Cutting rate: 150 (m/min)
Feed: 0.25 (mm/rev)
Depth of cut: 0.15 (mm)
Number of repeated times: 3 times
Lifetime judgment: machining time (min) until chipping or defect occurs.

The results of Cutting test 4 are shown in Table 15. Lifetimes of Comparative products 11 to 14 were less than 10 minutes. Lifetime of Present product 35 without coating film showed 2-times or more the lifetimes of Comparative products 11 to 14. By coating a film to Present products, lifetime was further improved. Of these, in particular, lifetimes of Present products 45 to 58 in which a coating film mainly comprising Ti and Al became 3 to 5-folds the lifetimes of Comparative products 11 to 14.

Utilizability in Industry

In the present invention, by providing optimum surface structures to the round honing surface and the chamfer honing surface of sintered cubic boron nitride tools respectively, elongation of tool lifetime can be realized under severe cutting machining such as high-load cutting machining or high-efficiency cutting machining. According to this, reduction in cost of a cutting machining can be made coupled with improvement in cutting machining efficiency, so that utilizability in industry is extremely large.

EXPLANATION OF REFERENCE NUMERALS

1 . . . Sintered cubic boron nitride tool
2 . . . Hard alloy base metal
3 . . . Rake surface
4 . . . Relief surface
5 . . . Chamfer honing surface
6 . . . Round honing surface
7 . . . Cubic boron nitride
8 . . . Binder phase
9 . . . Profile curve of cubic boron nitride sintered body

What is claimed is:
1. A sintered cubic boron nitride tool comprising a cubic boron nitride, a binder phase and inevitable impurities,
wherein the sintered cubic boron nitride tool has a relief surface, a rake surface, a chamfer honing surface, and a round honing surface formed at an edge line which crosses the relief surface and the chamfer honing sur- face, the round honing surface having a radius of curvature R in the range of 10 to 50 μm, and
a ratio of PR to PC satisfies the relation of 1.2≦PR/PC≦8.0, wherein:
PR is a ratio of LRC to LRB;
PC is a ratio of LCC to LCB;
S is a reference length at least five times an average particle size of cubic boron nitride;
LRC is a total length of profile curves of cubic boron nitride included in the reference length S of the round honing surface;
LRB is a total length of profile curves of the binder phase included in the reference length S of the round honing surface;
LCC is a total length of profile curves of cubic boron nitride included in the reference length S of the chamfer honing surface; and
LCB is a total length of profile curves of the binder phase included in the reference length S of the chamfer honing surface.

2. The sintered cubic boron nitride tool according to claim 1, wherein the sintered body comprises 40 to 90% by volume of cubic boron nitride, a binder phase and the remainder being inevitable impurities.

3. The sintered cubic boron nitride tool according to claim 1, wherein the cubic boron nitride has an average particle size of 0.30 to 6.0 μm.

4. The sintered cubic boron nitride tool according to claim 1, wherein the binder phase comprises:
at least one selected from the group consisting of a metal, nitride, carbide, boride, oxide of Group 4, 5, and 6 elements of the Periodic Table, a metal of Al, Si, Mg, Co, and Ni, and mutual solid solutions thereof.

5. The sintered cubic boron nitride tool according to claim 1, further comprising a coating film provided on a surface thereof.

6. The sintered cubic boron nitride tool according to claim 5, wherein the coating film is formed by at least one selected from the group consisting of a nitride, carbide or oxide of Group 4, 5, and 6 elements of the Periodic Table, Al, Si, B, Y and Mn, and mutual solid solutions thereof.

7. The sintered cubic boron nitride tool according to claim 5, wherein the coating film is a cubic crystal.

8. The sintered cubic boron nitride tool according to claims 5, wherein the coating film is formed by at least one selected from the group consisting of a nitride, carbide or oxide containing Ti and Al, and mutual solid solutions thereof.

9. The sintered cubic boron nitride tool according to claim 5, wherein a composition of the coating film is $(Ti_{(1-a-b)}Al_aM_b)(X)$, wherein:
M represents at least one element selected from Y, Cr, Si, Zr, Nb, Mn, W, Hf, V and B,
X represents at least one element selected from C, N and O,
a represents an atomic ratio of Al based on the sum of Ti, Al and M,
b represents an atomic ratio of M based on the sum of Ti, Al and M, and $0.1 \leq a \leq 0.7$ and $0.002 \leq b \leq 0.1$.

10. The sintered cubic boron nitride tool according to claim 1, wherein:
a ratio of PR to PC satisfies the relation of 1.9≦PR/PC≦8.0.

11. The sintered cubic boron nitride tool according to claim 10, wherein:
a ratio of PR to PC satisfies the relation of 2.1≦PR/PC≦5.0.

12. A sintered cubic boron nitride tool comprising:
a substrate comprising cubic boron nitride and a binder phase, the substrate having a relief surface, a rake surface, a chamfer honing surface, and a round honing surface formed at an edge line which crosses the relief surface and the chamfer honing surface;
wherein:
a ratio of PR to PC satisfies the relation of 1.2≦PR/PC≦8.0, wherein:
PR is a ratio of LRC to LRB;
PC is a ratio of LCC to LCB;
S is a reference length at least five times an average particle size of cubic boron nitride;
LRC is a total length of profile curves of cubic boron nitride included in the reference length S of the round honing surface;
LRB is a total length of profile curves of the binder phase included in the reference length S of the round honing surface;
LCC is a total length of profile curves of cubic boron nitride included in the reference length S of the chamfer honing surface; and
LCB is a total length of profile curves of the binder phase included in the reference length S of the chamfer honing surface.

13. The sintered cubic boron nitride tool according to claim 12, wherein the round honing surface has a radius of curvature R in the range of 10 to 50 μm.

14. The sintered cubic boron nitride tool according to claim 12, wherein the sintered body comprises 40 to 90% by volume of cubic boron nitride.

15. The sintered cubic boron nitride tool according to claim 10, wherein the cubic boron nitride has an average particle size of 0.30 to 6.0 μm.

16. The sintered cubic boron nitride tool according to claim 12, wherein the binder phase comprises:
at least one selected from the group consisting of a metal, nitride, carbide, boride, oxide of Group 4, 5, and 6 elements of the Periodic Table, Al, Si, Mg, Co, and Ni, and mutual solid solutions thereof.

17. The sintered cubic boron nitride tool according to claim 12, further comprising a coating film provided on a surface thereof.

18. The sintered cubic boron nitride tool according to claim 17, wherein the coating film is formed by at least one selected from the group consisting of a nitride, carbide or oxide of Group 4, 5, and 6 elements of the Periodic Table, Al, Si, B, Y and Mn, and mutual solid solutions thereof.

19. The sintered cubic boron nitride tool according to claim 17, wherein the coating film is cubic crystal.

20. The sintered cubic boron nitride tool according to claim 17, wherein the coating film is formed by at least one selected from the group consisting of a nitride, carbide or oxide containing Ti and Al, and mutual solid solutions thereof.

21. The sintered cubic boron nitride tool according to claim 17, wherein a composition of the coating film is $(Ti_{(1-a-b)}Al_aM_b)(X)$, wherein:
M represents at least one element selected from Y, Cr, Si, Zr, Nb, Mn, W, Hf, V and B,
X represents at least one element selected from C, N and O,
a represents an atomic ratio of Al based on the sum of Ti, Al and M,
b represents an atomic ratio of M based on the sum of Ti, Al and M, and
$0.1 \leq a \leq 0.7$ and $0.002 \leq b \leq 0.1$.

22. The sintered cubic boron nitride tool according to claim 12, wherein:
a ratio of PR to PC satisfies the relation of $1.9 \leqq PR/PC \leqq 8.0$.

23. The sintered cubic boron nitride tool according to claim 22, wherein:
a ratio of PR to PC satisfies the relation of $2.1 \leqq PR/PC \leqq 5.0$.

* * * * *